United States Patent
Postoyko (10) Patent No.: US 9,619,664 B2
(45) Date of Patent: Apr. 11, 2017

(54) SYSTEMS AND METHODS FOR HANDLING ELECTRONIC MESSAGES

(75) Inventor: John D. Postoyko, London (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 432 days.

(21) Appl. No.: 12/947,489

(22) Filed: Nov. 16, 2010

(65) Prior Publication Data

US 2011/0119771 A1 May 19, 2011

(30) Foreign Application Priority Data

Nov. 17, 2009 (EP) ..................................... 09176165

(51) Int. Cl.
*G06F 21/10* (2013.01)
*G06F 21/62* (2013.01)
*H04L 12/58* (2006.01)

(52) U.S. Cl.
CPC .......... *G06F 21/6209* (2013.01); *H04L 51/08* (2013.01); *H04L 51/12* (2013.01); *G06F 2221/2141* (2013.01)

(58) Field of Classification Search
CPC ......... H04L 51/04; H04L 51/08; H04L 51/24; H04L 51/32; H04L 51/14; H04L 67/10
See application file for complete search history.

(56) References Cited

U.S. PATENT DOCUMENTS

| 5,903,723 | A * | 5/1999 | Beck ....................... G06F 17/22 707/999.01 |
| 6,671,718 | B1 * | 12/2003 | Meister ................ G06Q 10/107 709/201 |
| 6,721,784 | B1 * | 4/2004 | Leonard et al. .............. 709/206 |
| 8,112,482 | B1 * | 2/2012 | Geddes ......................... 709/206 |
| 2001/0054073 | A1 * | 12/2001 | Ruppert ............... G06Q 10/107 709/206 |
| 2004/0177271 | A1 * | 9/2004 | Arnold et al. ................ 713/201 |
| 2005/0278430 | A1 * | 12/2005 | Cato ............................ 709/206 |
| 2006/0274856 | A1 * | 12/2006 | Dunn et al. ................... 375/316 |

(Continued)

OTHER PUBLICATIONS

Tracy et al., Guidelines on Electronic Mail Security, 2007.*

*Primary Examiner* — Eleni Shiferaw
*Assistant Examiner* — Huan V Doan
(74) *Attorney, Agent, or Firm* — Griffiths & Seaton PLLC (57) ABSTRACT

Systems and methods for handling electronic messages are provided. One method includes monitoring a message and recipients of the message, detecting a reference in the monitored message to an entity, obtaining an access control list for the detected entity, the access control list defining permitted access to the entity, identifying a recipient of the message who is not permitted to access the entity, and performing a predefined action in response to the identification of the non-permitted recipient. The predefined action includes one or more specific actions such as identifying an administrator for the access control list, generating a reporting message, and transmitting the reporting message to the administrator. The predefined action additionally or alternatively includes preventing the transmission of the message to the non-permitted recipient and/or providing an alert to the author of the message. One system includes a processor and memory storing code for performing the above method.

11 Claims, 6 Drawing Sheets

(56) References Cited

U.S. PATENT DOCUMENTS

| | | | |
|---|---|---|---|
| 2007/0005708 A1* | 1/2007 | Juliano | G06Q 10/00 709/206 |
| 2007/0283150 A1* | 12/2007 | Cozianu | H04L 63/0428 713/168 |
| 2008/0028017 A1* | 1/2008 | Garbow et al. | 709/201 |
| 2009/0241197 A1* | 9/2009 | Troyansky | H04L 12/5885 726/26 |

* cited by examiner

SYSTEMS AND METHODS FOR HANDLING ELECTRONIC MESSAGES

CROSS-REFERENCE TO RELATED APPLICATION

This application claims priority to European Patent Application No. 09176165.0, filed Nov. 17, 2009, and entitled "Message Handling," which is incorporated herein by reference.

BACKGROUND OF THE INVENTION

Field of the Invention

The invention relates in general to computing systems, and particularly to, systems and methods for handling electronic messages.

Description of the Related Art

In a modern business environment, it is common for co-workers to communicate using electronic messaging systems such as email and instant messaging. These systems allow co-workers to communicate, by the sending and receiving of messages. Other entities such as databases and calendars are also commonly used in such environments to assist in the business processes being use by individual companies, and these can be referenced in messages such as emails. Collaborative working allows for the creation of entities, such as documents, within a system that can be shared with one or more users. The ability for any one individual to access such entities is typically controlled by an access control system. Permissions are set on an entity to establish who may see or access the entity. Entities may, in turn, contain other entities and/or may contain references to other entities, each of which is additionally protected by particular access control settings.

Collaborative working allows for the sharing of entities, such as documents, between individuals. When sharing these entities, it is common for a link to the entity, rather than the contents of the entity, to be created and sent to one or more individuals via a message. There are many reasons for this, but primarily pertains to the fact that the information contained within the entity remains protected by the access control system. In email terms, a document link is created. This link may be included within an email, and the email is distributed to one or more individuals. This can also be extended to a situation where a (document) link is copied by one user and transmitted to another user via, for example, instant messaging technologies. Upon receipt of the document link, users can use the link to attempt to open the target entity, which depending on the user's ability to access/open the link, will either succeed or fail. Since the target entity may itself contain other entities either embedded or referenced via document links, being able to open the initial root entity does not guarantee the user being able to see the other related entities. This means that the ability of users to receive a link is distinct from their ability to subsequently view the contents of the link. This mismatch has two potential negative side effects.

For example, a message may be sent to the correct recipient, but with an incorrect access control in place, for an object in the message. Users for whom the object was correctly intended, but for whom the access control on the entity are incorrect, cannot access the information. The effect of this situation is that the user attempts to access the entity or an entity contained/referenced by the entity and cannot do so because of the incorrect permissions. The consequence of this is the inability of one or more individuals to access the information, which may impair decision making Remediation must be sought to rectify the situation, which requires additional time and resources. This can be particularly problematic in situations where information is shared between teams in different time zones. Faced with this situation users may resort to a copy and paste of the entire contents of the entity to circumvent the access problems as quickly as possible.

A second potential negative situation occurs, with a wrong recipient of a message, but with correct access permissions. This second side effect relates to the incorrect addressing of a message such as an email to one or more individuals. In large organizations, it is common for a number of individuals to share the same name. While variations of name constructs are used to identify each individual user, it is still possible to send an email to the wrong person. While in such cases, the wrong recipient should not be able to access the entity, the message content may itself contain information not intended for the individual. The effect of this is that a user receives information not intended for them to see and will be correctly blocked from accessing the linked entities. A consequence of this is that a user may be exposed to privileged information contained within the body of a message.

It is therefore an object of the invention to improve upon the known art.

SUMMARY OF THE INVENTION

According to a first aspect of the present invention, there is provided a method of handling a message comprising monitoring the message and recipients of the message, detecting a reference in the monitored message to an object, obtaining an access control list for the detected object, the access control list defining permitted access to the object, identifying a recipient for the message who is not permitted to access the object, and performing a predefined action in response to the identification of the non-permitted recipient.

According to a second aspect of the present invention, there is provided a message handling system comprising a message monitoring component arranged to monitor a message and recipients for the message, detect a reference in the monitored message to an object, obtain an access control list for the detected object, the access control list defining permitted access to the object, identify a recipient for the message who is not permitted to access the object, and perform a predefined action in response to the identification of the non-permitted recipient.

According to a third aspect of the present invention, there is provided a computer program product on a physical computer-readable medium (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) for handling electronic messages, the product comprising instructions for monitoring the message and recipients for the message, detecting a reference in the monitored message to an object, obtaining an access control list for the detected object, the access control list defining permitted access to the object, identifying a recipient for the message who is not permitted to access the object, and performing a predefined action in response to the identification of the non-permitted recipient.

Owing to the invention, it is possible to provide a messaging system that detects when a user is composing or has composed a message that includes a reference to an object to which one or more recipients does not have access. The detection of the non-permitted recipient, in relation to that object, will result in one or more remedial actions being taken. The object in the message may be an explicit link to another entity such as a document or database entry. The solution provided by the messaging system with this functionality will avoid the problems inherent in the prior art systems, which do not detect whether a recipient can actually access the object, to which they are being directed, in the message.

In one embodiment, the predefined action comprises identifying an administrator for the access control list, generating a reporting message, and transmitting the reporting message to the administrator. One action that can be taken in response to the detection of the non-permitted recipient for an object is to notify the administrator of the object's access control list with an automatically generated message that informs the administrator that the event has occurred. This has two advantages, firstly that the administrator can identify if a security breach might be occurring and secondly, if necessary, the administrator can respond to the detection of the non-permitted recipient of an object by adding the recipient to the access control list.

In another embodiment, the predefined action comprises preventing the transmission of the message to the non-permitted recipient. Since, as mentioned above, there may be additional information in the body of the message in relation to the reference to the external object, it may be advisable to quarantine the message until some review process has taken place. This will prevent the dissemination of confidential and/or privileged information to individuals who should not receive such information. The prevention of the transmission of the message after the detection of the non-permitted recipient for an object in the message can take place automatically and can hold the message for a defined period of time, or until a specific action has been taken to approve the sending, perhaps by a higher authority, or to add the recipient to the access control list for the referenced object.

In yet another embodiment, the predefined action comprises providing an alert to the author of the message. This alert can occur while a message is being created, or may occur after the user has instructed the sending of the message. The alert could be a user interface flag, once an object is referenced in a message, to indicate to the author of the message that one or more intended recipients do not have access to the object. The alert could be generated in response to a defined user action requesting that the access control of the objects be checked against the intended recipients. The alert could be generated after a message has been sent, depending upon where the message handling is taking place in the messaging system. For example, once a message is quarantined, the alert could be provided to the author of the message, requesting that they perform some remedial action. The alert could be for information purposes only, or could place an action requirement onto the author.

In still another embodiment, the predefined action comprises amending the message to identify the non-permitted access to the object. If the message is to be sent to a recipient who does not have access to an object contained within the message, then the message can be amended to illustrate the status of the object to which reference is made. For example, a message may contain a link to a document stored in a database. The recipient of the message may not actually have access to the database that is storing the document. In this case, the action taken by the message handling system is to amend the link in the message to indicate to the recipient that although there is a link to an external object, the recipient does not presently have access to the entity. This can be achieved by inserting some text, changing the colour of the object reference, or using an icon to show the status. This action can be reversed, if later the recipient is added to the access control list for the object.

BRIEF DESCRIPTION OF THE DRAWINGS

Embodiments of the present invention will now be described, by way of example only, with reference to the accompanying drawings, in which.

DETAILED DESCRIPTION OF THE DRAWINGS

Figure 1:
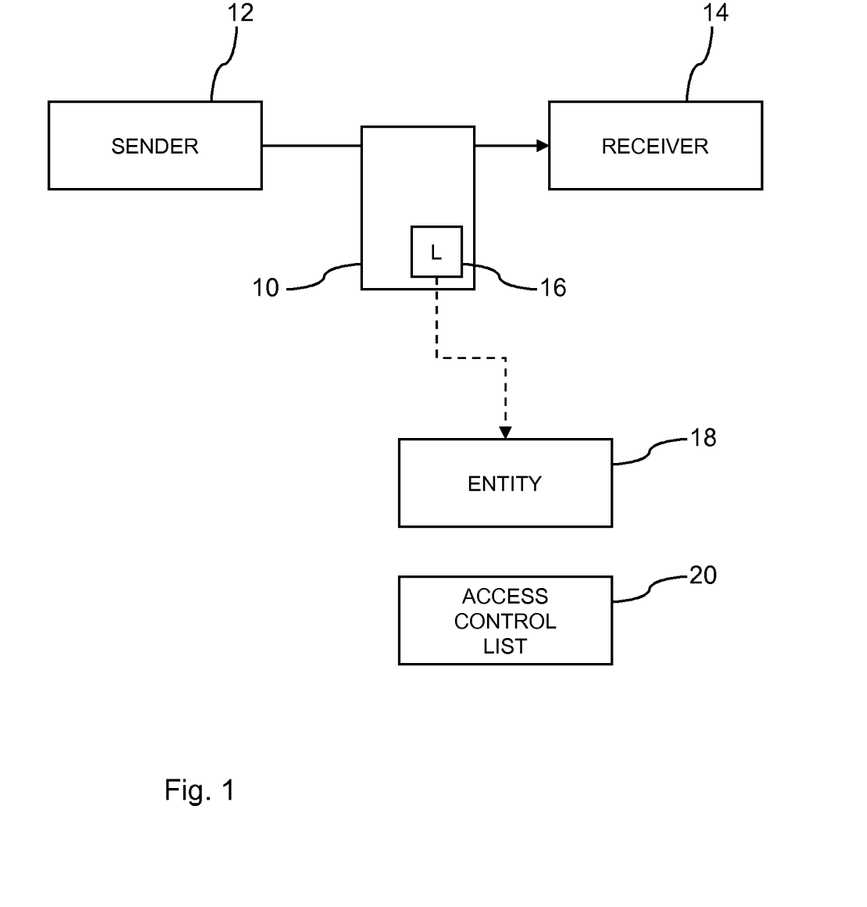
FIG. 1 is a block diagram of one embodiment of a messaging system.

A messaging system is shown in FIG. 1, in which a message 10 is sent from an author or sender 12 to a recipient or receiver 14. The messaging system could be an email system such as, for example, Lotus Notes®. Lotus Notes® is a client-server, collaborative application that provides integrated desktop client option for accessing business e-mail, calendars and applications on an IBM® Lotus Domino® server. Lotus Notes® can be considered a reference architecture that is used to illustrate the intent of the design of the messaging system. The system is not limited to Lotus Notes® as the techniques described can be applied to other similar systems. Instant messaging applications also involve the creation and sending of messages 10 from a sender 12 to one or more receivers 14.

The message 10 includes a reference or link 16 to an object or entity 18. The link 16 may be an explicit link, such as an HTTP address of an Internet or Intranet location, or a link to a database entry, or may be an implicit link, by reference to an entity 18 by name. For example, an implicit link may refer to a user's calendar, simply by referring to the calendar in normal text, without actually including a specific executable link to the calendar. The message 10 could, for example, state: "Please have a look at my calendar to see when I am free next week". This is sufficient to create a link 16 to an entity 18 (the entity 18 being the calendar) within the scope of the monitoring carried out by the messaging system.

The entity 18 has an access control list 20 associated with it. The access control list 20 defines who has the permission to access the entity 18. In general an administrator will have responsibility for maintaining the access control list 20. This system includes a mechanism for checking the access permissions of one or more entities 18 as referenced by links 16 against the receiver(s) 14 to whom the link 16 is being sent in the message 10. The system works by using the permissions contained in the access control list 20, which are associated with the entity 18, to determine if the action of sending a link 16 of that entity 18 to a receiver 14 is acceptable.

Figure 2:
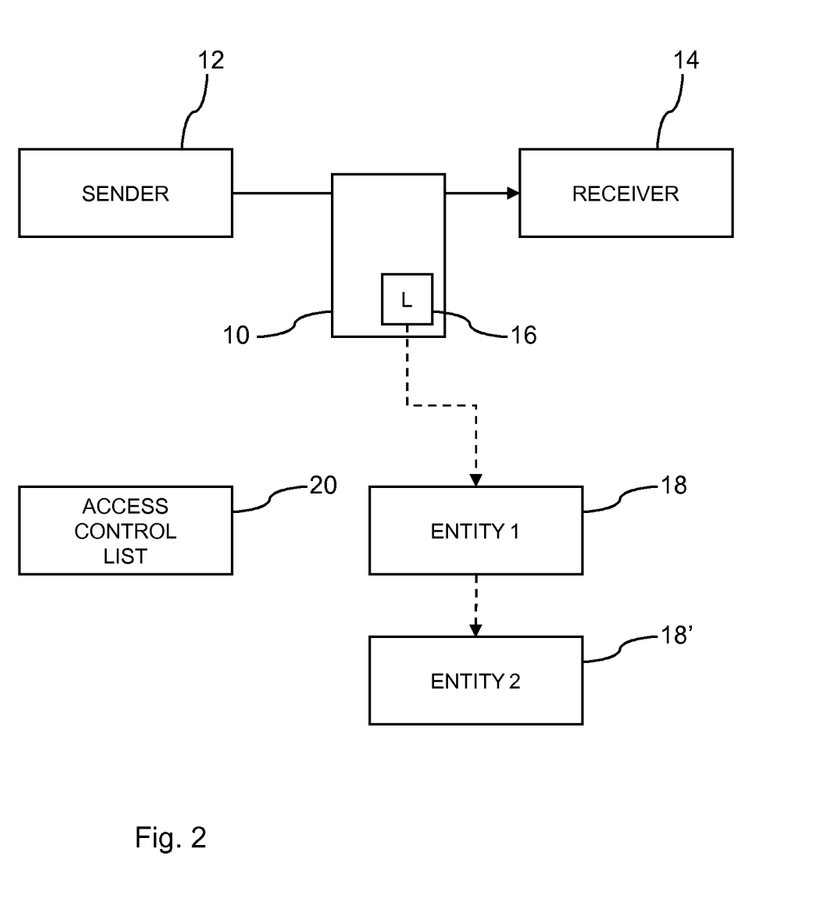
FIG. 2 is a further block diagram of the messaging system.

FIG. 2 shows an extension of the scenario illustrated in FIG. 1, in which a link 16 is made to an entity 18, which also has links to a further entity 18'. One or both of these entities 18 and 18' are protected by the access control list 20 (there may be different lists 20 for each entity 18). The receiver 14 of the message 10 may or may not be properly authorized to access all of the entities 18 and 18' that are being referenced in the original message 10. The system, however, is able to deal with this recursive situation where entities 18 refer to further entities 18', any or all of which may have permissions associated therewith, through one or more access control lists 20.

A first step taken is that when a sender 12 creates a document link 16 to an entity 18, the permissions associated with the entity 18 are obtained from the access control list 20. For illustration purposes, this entity 18 shall be termed the root entity 18. At step two, when the sender 12 invokes an action that would result in the document link 16 being sent to a receiver 14, the permissions associated with the root entity 18 stored by the access control list 20 are checked to see if the receiver 14 may subsequently be allowed open the entity 18. A step three is that, assuming the access control list 20 of the entity 18 permits the receiver 14 to view the entity 18, checks are then made on any entity 18' that is embedded or referenced by a document link within the root entity 18.

This step three is performed recursively down the linked and referenced entities 18 and 18' until either an entity 18 is detected for which the receiver 14 does not have permission to view or all referenced entities 18 have been checked. At step four, if the receiver 14 does not have permission to view any one of the entities 18, then the sender 12 will be blocked from completing the send action. A modification of this technique would allow for fine tuning of the system is so that, for example, the send action would be allowed to proceed if the receivers 14 have access to the root entity 18, but not, for example, additional entities 18' referenced by the root entity 18. At step five, if the receiver 14 has permission to view the entity 18 (and depending upon configuration) any and all related/referenced entities 18', the send action is allowed to complete.

The system facilitates a number of unique features. For example, the system provides a monitoring component in software that allows for a permissions check to be made prior to the sending of the message 10. For example, a sender 12 writes an email message 10 destined for one or more receivers 14. The body of the email message 10 contains at least one document link 16. The sender 12 invokes a "Check Permissions" option. By crosschecking the access control list 20 of the associated entity 18 (as indicated by the document link 16) with the permissions of each intended receiver 14 of the email message 10, the sender 12 would be alerted if one or more intended receivers 14 are unable to view one or more linked documents 18.

Figure 3:
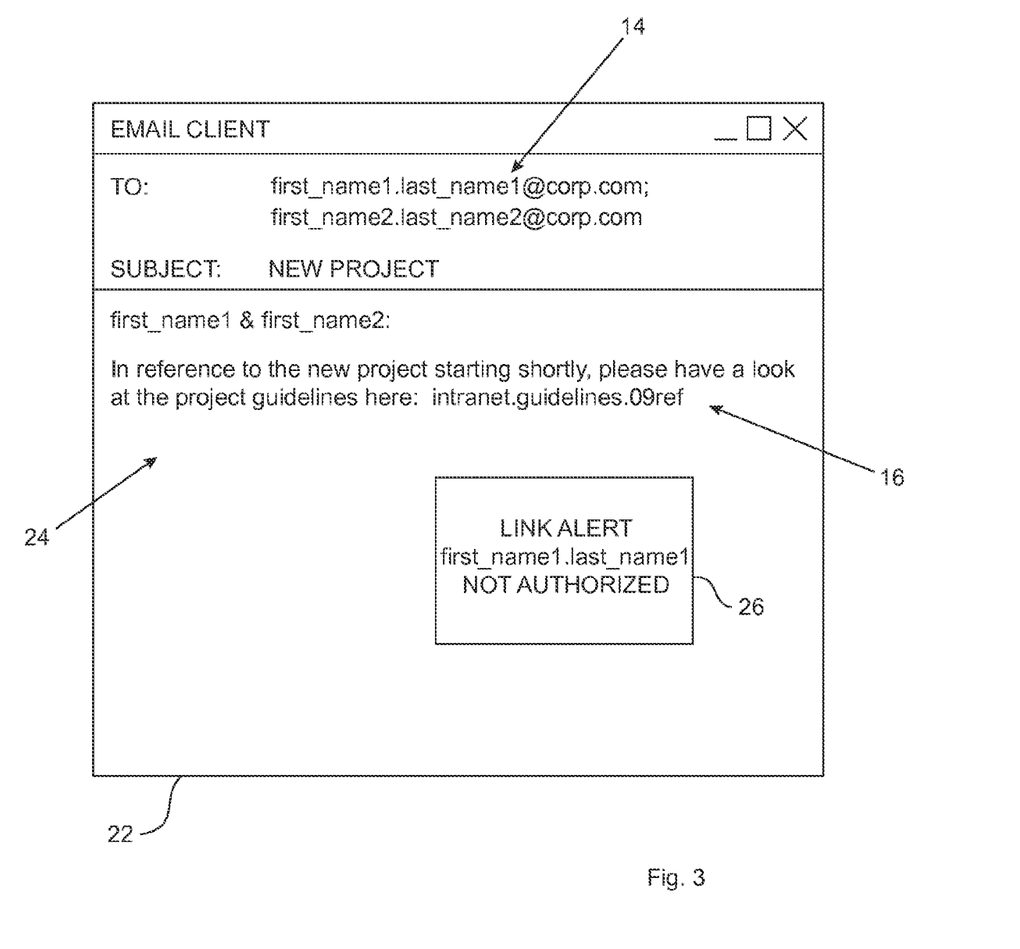
FIG. 3 is a schematic diagram of one embodiment of a graphical user interface to a messaging client.

FIG. 3 shows how a graphical user interface 22 to an email client may look, in a messaging system that incorporates the checking feature. The sender 12 is typing email text 24 into the email client. The email has two intended receivers 14. The sender 12 wishes to supply a link 16 "intranet.guidelines.09ref" which links to an entity 18, being a document stored in a database available via the company intranet. An alert 26 may take the form of a direct indicator within the email graphical user interface 22. In this example, the alert 26 takes the form of a message and icon representing a permissions issue. In addition, the font and colour of receivers 14 unable to view the entity 18 could be changed within the email's "TO:" field, "CC:" field, and/or "BCC:" field.

An alternative configuration provides an indication, within a message 10, that the permission of a linked entity 18 (e.g., a document) does not allow an individual receiver 14 to see the entity 18. For example, if a receiver 14 gets an email message 10 containing a document link 16 to an entity 18, for which the receiver 14 does not have permission to view, the email client will provide a visual indicator that the link 16 is not valid for that receiver 14. The client adds a visual message and/or icon to the email message 10 or to the email summary showing there are permissions issues. If the receiver 14 opens the email text 24 and positions the mouse cursor over the document link 16 then, for example, there is a change in the mouse over cursor to a blocked or locked icon and the receiver 14 is prevented from attempting to open the document link 16.

The system, in one embodiment, is configured to provide automatic informing of an administrator. If a receiver 14 is sent an email message 10 containing a document link 16 to an entity 18 to which they do not have permission to view, one of the first things the receiver 14 will do upon receiving the email message 10 is to click on the document link 16 and discover that they cannot access the related entity 18 and then begin the process of obtaining access. As an email message 10 is in transit through the email system, checks are made to see if each receiver 14 is currently allowed to view the linked entity or entities 18.

Figure 4:
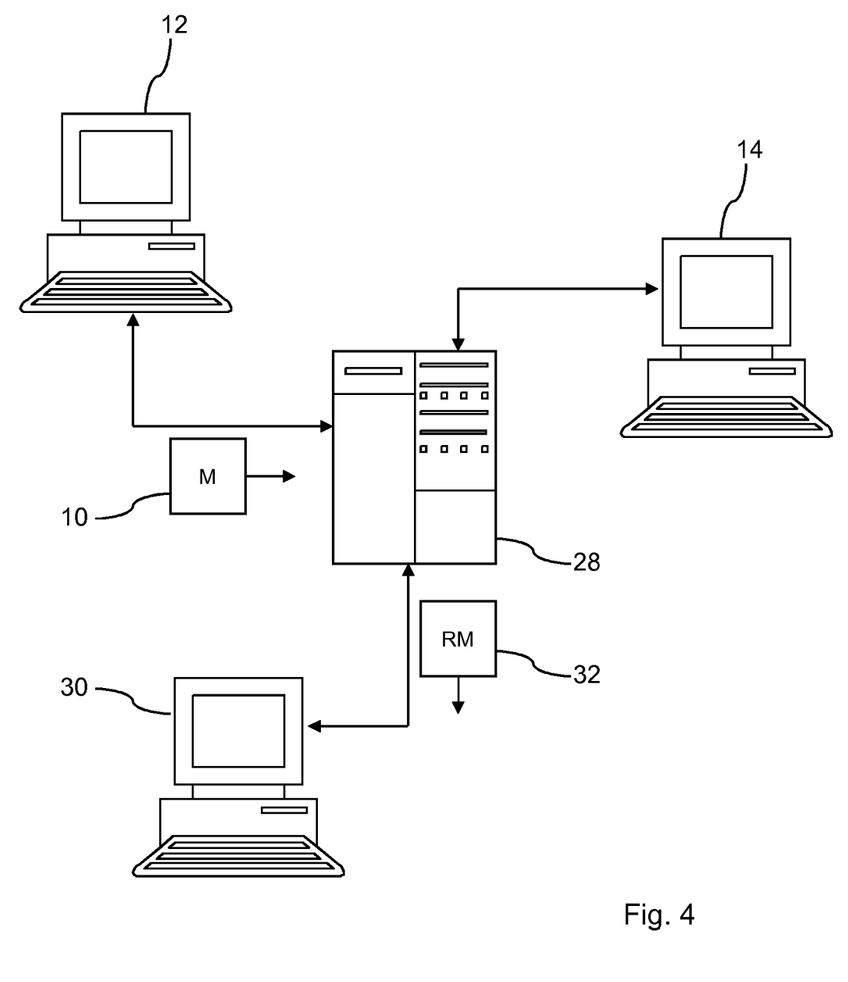
FIG. 4 is a schematic diagram of a messaging system including an administrator.

Details of any mismatches between the receivers 14 and the associated entity access control lists 20 for the referenced entity or entities 18 are detected and recorded. The system generates a pre-emptive email notification regarding probable email messages 10 from those senders 12 and sends the notification to the entity's owner/administrator. This is illustrated in FIG. 4, where an email server 28 is shown. Here, email server 28 is receiving the email message 10 from a sender device 12, storing the email message 10, and is then transmitting that email message 10 to the receiver device 14 when the receiver 14 next checks their email inbox. The email server 28 includes a message monitoring component that is responsible for identifying entities 18 referred to in email messages 10.

The message monitoring component monitors the message 10 and the receivers 14 of the message 10 and detects any reference 16 in the monitored message 10 to an entity 18. For the detected entity 18, the respective access control list 20 is obtained, and if there is identified a receiver 14 for the message 10 who is not permitted to access the entity 18, then one or more predefined actions is performed in response to the identification of the non-permitted receiver 14. In this case, a predefined action comprises identifying an administrator 30 for the access control list 20, generating a reporting message 32, and transmitting the reporting message 32 to the administrator 30.

To increase message security, it is possible for the system to use the concept of delayed delivery. From a security audit aspect, checking that receivers 14 are not being sent links 16 to entities 18 that they should not be seeing since many people share the same name, and will therefore end up having similar email addresses (e.g., Jon Doe, John Doe, Jon Doe1, Jon Doe2, etc.). In such situations, it is easy for the sender 12 to address an email message 10 to a wrong receiver 14. The text 24 of the email message 10 may, in addition to document links 16, contain written information to which the receiver 14 is not privileged.

In such situations, the fact that the receiver 14 does not have permission to access any or all of the entities 18 described by one or more document links 16, may be taken to infer that the stated receiver 14 is not the intended receiver 14 of the email message 10. Rather than deliver the email message 10, the system could deliver a notification to the receiver 14 that an email message 10 was received from the sender 12 but that there was a problem with the contents of the email message 10. The system would notify the sender 12 of this mismatch and await clarification from the sender 12. Once this has been done, the email message 10 would be delivered to the receiver 14.

Figure 5:
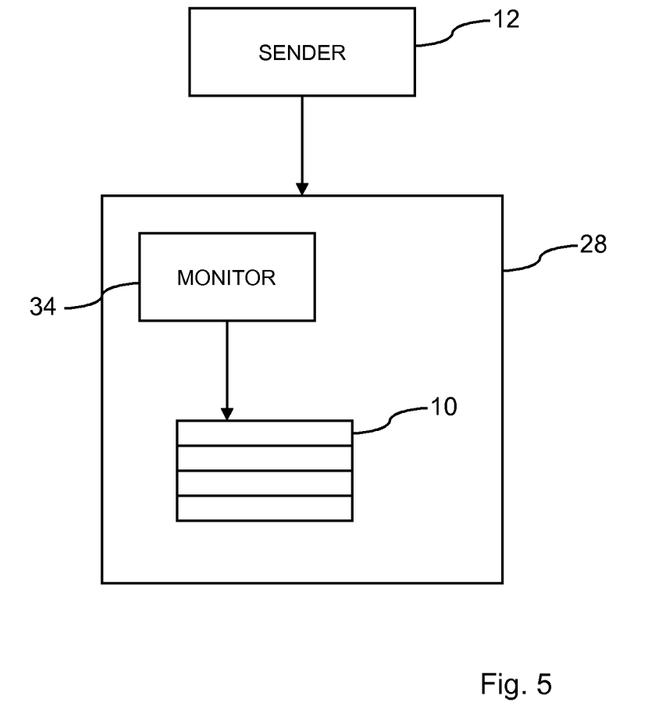
FIG. 5 is a block diagram of an email server of the messaging system.

FIG. 5 shows an implementation of the email server 28, in which the transmission of the message 10 to the non-permitted receiver 14 is prevented. The message monitoring component 34, which could be a hardware component or could be implemented in software, or a combination thereof, will monitor the received messages 10 and will retain any message 10 that is identified as having a non-permitted receiver 14 in relation to a linked entity 18, on the email server 28. A notification will be sent back to the sender 12, who must take action in relation to the retained message 10, if that message 10 is to be sent on to the ultimate receiver 14. This action might be, for example, amending the appropriate access control list 20 in relation to that receiver 14 and the linked entity 18.

The methodology described above with respect to an emailing message system is equally applicable in other message environments. For example, instant messaging systems are commonly used in business environments to facilitate conversations between individuals in different locations. Such applications allow users to type in text in an application window and press enter or send and the text is rendered in the application window of all the other users currently participating in the instant messaging session. This type of communication can be considered as a synchronous communication system, whereas, email is an asynchronous messaging system. Nevertheless, the monitoring of messages to identify the problems with links can be carried out in both types of messaging system.

When using instant messaging, it is possible to copy and paste a document link 16 into a chat window. The receiver 14 of that link 16 can then select the link and attempt to view the related entity 18. That action of selection is subject to the same constraints as selecting the document link 16 from within an email message 10. If a sender 12 were to copy and then paste a document link 16 into a instant messaging chat buffer (prior to sending), the system would check that each receiver 14 of the cut and paste has permission to view the associated entities 18. For any receiver 14 not able to view the entity 18, the message 10 would be blocked, and a different message relaying the fact that the original message 10 had failed would be presented in its place.

Figure 6:
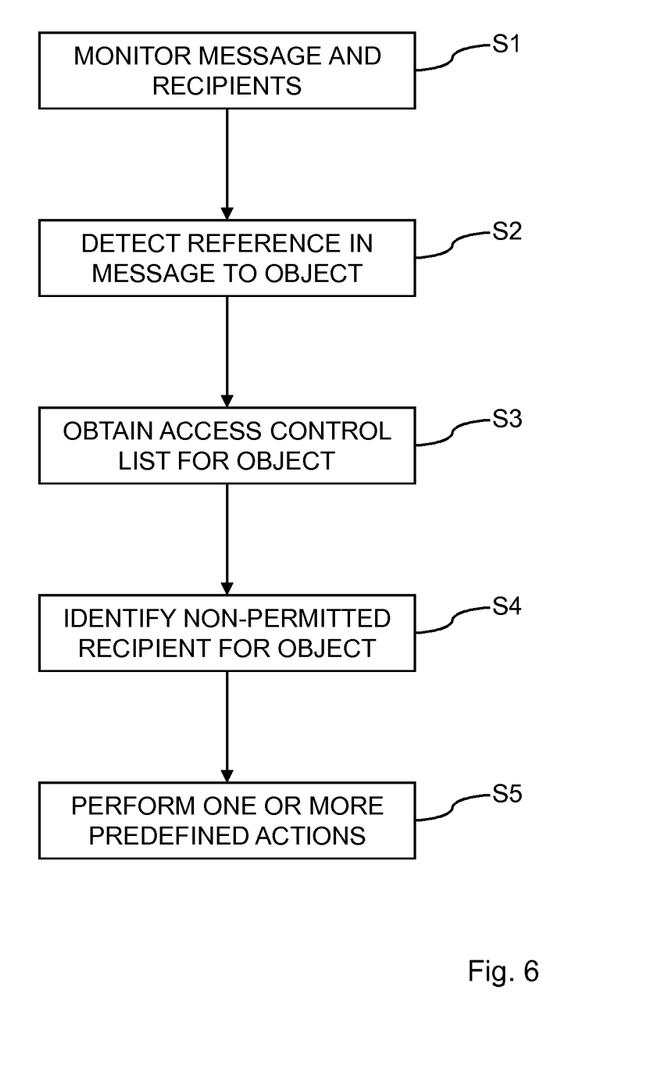
FIG. 6 is a flow diagram of one embodiment of a method for handling a message.

The overall methodology is summarised in FIG. 6. The method of handling the message comprises, at step S1, monitoring the message 10 and the receivers 14 for the message 10. At step S2, detecting a link 16 in the monitored message 10 to an entity 18 is carried out, and as a result, at step S3, there is obtained an access control list 20 for the detected entity 18. Here, the access control list 20 defines permitted access to the entity or entities 18. If then, at step S4, there is identified a potential receiver 14 of the message 10 who is not permitted to access the entity 18, then at step S5, the method terminates with the step of performing one or more predefined actions in response to the identification of the non-permitted receiver 14.

As detailed above, the action in response to the identification of the non-permitted receiver 14 could take various forms. The sender 12 of the message 10 may be prevented from sending the message 10, or may be unable to send the message 10 to that specific non-permitted receiver 14. An alert 26 could be provided which either requires a mandatory response, or is just for information purposes only. Additionally, or alternatively, a new message 32 may be generated that is sent to an administrator/owner of the access control list 20 for the specific entity 18, in order to keep that individual informed about attempted accesses by non-permitted receivers 14. This also allows the administrator/owner of the access control list 20 for the specific entity 18 to add the non-permitted receiver 14 to the relevant access control list 20.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for handling electronic messages by a processing device comprising:
   monitoring, by the processing device, the creation of an electronic message from an author;
   monitoring, by the processing device, an inclusion of one or more recipients of the electronic message during the creation of the electronic message;
   during the creation of the electronic message, detecting a reference to an entity by recursively checking down a link within a root entity to any subsequent links within the root entity and further any subsequent embedded or referenced entities within the subsequent links, until all links are checked in the electronic message to detect any entity of which the one or more recipients does not have a permission to access, the links including either an explicit executable link or an implicit link;
   after the detecting, obtaining an access control list for the detected entity during the creation of the electronic message and prior to the author sending the electronic message to the one or more recipients, the access control list defining a group of one or more recipients permitted access to the entity;
   identifying, during the creation of the electronic message and prior to the author sending the electronic message to the one or more recipients, each recipient of the electronic message that is not permitted to access the entity; and
   performing a predefined action in response to identification of each non-permitted recipient including:
      providing an alert to the author of the electronic message during the creation of the electronic message and prior to the author sending the electronic message to the one or more recipients, the alert indicating that one or more recipients are not permitted to access the entity;
      preventing the transmission of the electronic message of which is unamended to each non-permitted recipient; and
      amending the electronic message, by adding a locked icon, to indicate to the one or more recipients that the electronic message includes the link to the entity and that the recipient is not permitted to access the entity.

2. The method according to claim 1, wherein the predefined action comprises:
   identifying an administrator for the access control list;
   generating a reporting message; and
   transmitting the reporting message to the administrator.

3. The method according to claim 1, wherein the predefined action comprises transmitting a notice to the author that one or more recipients are not permitted to access the entity, the method further comprising:
   receiving an indication from the author to add the recipient to the group of one or more recipients permitted to access the entity;
   adding the recipient to the group of one or more recipients permitted to access the entity; and
   transmitting the electronic message to the recipient.

4. The method according to claim 1, wherein the electronic message is one of an email message or an instant message.

5. A message handling system, comprising:

a processor; and memory coupled to the processor, wherein the memory comprises:

a message monitoring component storing code that, when executed by the processor, causes the processor to:

monitor the creation of an electronic message from an author, monitor one or more recipients of the electronic message during the creation of the electronic message, during the creation of the electronic message, detect a reference to an entity by recursively checking down a link within a root entity to any subsequent links within the root entity and further any subsequent embedded or referenced entities within the subsequent links, until all links are checked in the electronic message to detect any entity of which the one or more recipients does not have a permission to access, the links including either an explicit executable link or an implicit link, after the detection, obtain an access control list for the entity during the creation of the electronic message and prior to the author sending the electronic message to the one or more recipients, the access control list defining a group of one or more recipients permitted access to the entity, identify, during the creation of the electronic message and prior to the author sending the electronic message to the one or more recipients, a recipient of the electronic message that is not permitted to access the entity, and perform a predefined action in response to the identification of the non-permitted recipient including:

to provide an alert to the author of the electronic message during the creation of the electronic message and prior to the author sending the electronic message to the one or more recipients, the alert indicating that one or more recipients are not permitted to access the entity;

to prevent the transmission of the electronic message of which is unamended to each non-permitted recipient; and to amend the electronic message, by adding a locked icon, to indicate to the one or more recipients that the electronic message includes the link to the entity and that the recipient is not permitted to access the entity.

6. The system according to claim 5, wherein the code stored in the message monitoring component further causes the processor to:

identify an administrator for the access control list;

generate a reporting message; and transmit the reporting message to the administrator when performing the predefined action.

7. The system according to claim 5, wherein the code stored in the predefined action comprises code for transmitting a notice to the author that one or more recipients are not permitted to access the entity, and wherein the code stored in the message monitoring component further comprises code that causes the processor to:

receive an indication from the author to add the recipient to the group of one or more recipients permitted to access the entity;

add the recipient to the group of one or more recipients permitted to access the entity; and transmit the electronic message to the recipient.

8. The system according to claim 5, wherein the electronic message is one of an email message or an instant message.

9. A computer program product on a physical computer-readable device for handling electronic messages, the product comprising:

computer code for monitoring the creating of an electronic message from an author;

computer code for monitoring one or more recipients of the electronic message during the creation of the electronic message;

computer code for, during the creation of the electronic message, detecting a reference to an entity by recursively checking down a link within a root entity to any subsequent links within the root entity and further any subsequent embedded or referenced entities within the subsequent links, until all links are checked in the electronic message to detect any entity of which the one or more recipients does not have a permission to access, the links including either an explicit executable link or an implicit link;

computer code for, after the detecting, obtaining an access control list for the entity during the creation of the electronic message and prior to the author sending the electronic message to the one or more recipients, the access control list defining a group of one or more recipients permitted access to the entity;

computer code for identifying, during the creation of the electronic message and prior to the author sending the electronic message to the one or more recipients, a recipient of the electronic message that is not permitted to access the entity; and computer code for performing a predefined action in response to the identification of the non-permitted recipient including:

providing an alert to the author of the electronic message during the creation of the electronic message and prior to the author sending the electronic message to the one or more recipients, the alert indicating that one or more recipients are not permitted to access the entity;

preventing the transmission of the electronic message of which is unamended to each non-permitted recipient; and amending the electronic message, by adding a locked icon, to indicate to the one or more recipients that the electronic message includes the link to the entity and that the recipient is not permitted to access the entity.

10. The computer program product according to claim 9, wherein the computer code for performing the predefined action comprises:

computer code for identifying an administrator for the access control list;

computer code for generating a reporting message; and computer code for transmitting the reporting message to the administrator.

11. The computer program product according to claim 9, wherein the computer code for performing the predefined action comprises computer code for transmitting a notice to the author that one or more recipients are not permitted to access the entity, and wherein the product further comprises:

computer code for receiving an indication from the author to add the recipient to the group of one or more recipients permitted to access the entity;
computer code for adding the recipient to the group of one or more recipients permitted to access the entity; and
computer code for transmitting the electronic message to the recipient.

* * * * *